Patented Apr. 17, 1945

2,373,805

UNITED STATES PATENT OFFICE 2,373,805

PROCESS OF MAKING A FOOD PRODUCT

Fred H. Barker, Los Angeles, Calif.

No Drawing. Application July 14, 1941,
Serial No. 402,420

9 Claims. (Cl. 99—124)

This invention relates to a dried food product and a process of making the same. It has as its object to provide a dried, comminuted food product adapted for use in preparing soup, broth, and other food dishes, which will be light in weight, which will comprise dry, free flowing, granular material easy to package and to handle, which will keep indefinitely without refrigeration or the admixture of preservatives, and from which food dishes such as soup and broth may be readily prepared for serving.

A further object of the invention is to provide a dry, granular food product which will use those portions of animals and birds slaughtered for food which have heretofore been of little or no value.

It is a further object of the invention to provide a dried, granular food product from which may be prepared food dishes of high nutritive value, palatability, and hygienic qualities.

It is also an object of this invention to provide a process by which a dried, granular food product with the above-mentioned qualities may be produced.

It is also an object of the invention to provide a process by which it is made possible to add many ingredients to the dried product which are difficult to incorporate or impossible to incorporate without loss of flavor, aroma, and certain desirable constituents in preparing similar food products in canned or liquid form.

A food product embodying this invention and made by a process embodying this invention is of especial utility for campers, exploration parties, airplane trips, and for armed forces while on field duty.

While the product is primarily intended for the preparation of soup and broth, it obviously may be utilized in the preparation of baked, boiled, and other food dishes. Also, while the invention is applicable to the preparation of a dried food product from the slaughtered carcasses of any form of edible animal life, the invention will be herein described as applied to a food product prepared from that species of galliformes which is the common domestic fowl popularly known as the chicken.

Fat cut from the body portion of chickens is rendered in a steam cooker and the residue removed. The rendered fat is mixed with an absorbent filler, preferably raw comminuted cereal such as cornmeal or wheat flour. Any edible material may be used for this purpose which is absorbent to a substantial degree by reason of the porous nature of its particles or by reason of the absorbent character of an aggregated mass of its particles. Other ingredients, such as salt, dried vegetable powders, spices, egg yolk, dextrose or other sweetening agent, may be added to the mixture in such selection and in such proportions as may be desired to give nutritive value, flavor, and palatability to the food dishes in the preparation of which the dried food product of this invention is used.

After the above ingredients are thoroughly mixed, or in the course of the mixing process, water or milk or both are added in a quantity sufficient to produce a pasty mass. These aqueous liquids not only give coherence to the mixture of ingredients, but also dissolve the soluble ingredients such as dextrose and salt and soluble components of the dried vegetable powders, thereby causing a uniform distribution and penetration of the solute throughout the pasty mass. When used, milk also enhances the nutritive value of the completed product.

The pasty mass thus produced, is comminuted in any suitable manner to form pellets, spicules, or granules of small size which may average an eighth of an inch as to their greatest dimension, but which will vary from minute bodies to granules of a quarter of an inch or more in size.

The granules are then spread and dried at a temperature of from 140° to 180° F., but in any event substantially less than the boiling point of water. The period of heat application is sufficient to drive off from the granules all of the free water and capillary water which the granules contain. The heat also cooks the raw ingredients of the granules and blends all of the ingredients, giving all parts of the granules a uniform flavor and aroma.

As stated above, many of the ingredients may be selected and proportioned on the basis of the desired nutritive value and palatability of the product. The proportion of edible, comminuted material of substantial absorbent capacity, such as cornmeal or wheat flour, however, must be carefully determined. The proportion of this absorbent material must be sufficient to hold in an absorbed state in the dehydrated granules the fat and other non-aqueous constituents which are liquid or partially liquid at normal atmospheric temperature. More than this amount of absorbent material may be used if desired from other considerations, but there must be at least a sufficient proportion to hold absorbed the fat and other non-aqueous constituents.

This proportioning of the absorbent material results in giving the finally dried product the character of a free flowing, comminuted mass of shape-retaining granular bodies which may be readily packaged, preferably in ordinary transparent waxed paper, and which may be readily removed from the package.

The granules so formed are substantially free from a surface coating of fat or other non-aqueous liquids and are but slightly greasy.

In determining the proportion of absorbent material, due allowance may be made for the absorbent qualities of such ingredients as the dried vegetable powder. The dextrose or other sweetening agent and the milk act as binders to give coherence to the dried granules.

If desired, the above process may be modified by adding to the mixture prior to or during its hydration dried meat in comminuted form obtained from the meaty portions of the chicken carcass. In this manner additional characteristic flavor and aroma may be given the food dishes prepared from the food product of this invention and their nutritive value increased.

The product and process may also be modified in another manner to reduce the cost of the product, to increase its flavor and aroma, and to give body or thickening to the food dishes prepared from the product. In practicing this further modification of the invention, those parts of the animal are utilized which are rich in gelatine, such as the head, horns, hoofs, and skin of cattle, sheep, and other four-footed animals, and the feet of chickens, turkeys and other fowl of the genus Galliformes.

Thus, for instances, in the preparation of a food product in the form of a chicken derivative in accordance with this invention, chicken feet are crushed and steam cooked at superatmospheric pressure. The solid residue is strained from the gel produced in this cooking operation. This gel is rich in gelatine and in the flavoring and aromatic substances characteristic of chicken and contains a limited amount of fat, proteins, and other edible materials. This gel is then mixed with rendered chicken fat. The proportions of gel and fat in this mixture may vary over a considerable range and yet produce a satisfactory food product, but it has been found that a mixture of 60% gel and 40% fat is most satisfactory from the standpoint of low cost, flavor, nutritive value, thickening of the food dishes made from the product, and the free flowing and shape-retaining qualities of the granules.

The process after mixing the gel and fat is the same as that described above for the preparation of a food product without the use of a gel, it being understood that the proportion of edible, comminuted material of substantial absorbent capacity may have to be varied to some extent. If the proportion of fat to all other ingredients in a final product made in accordance with this modified form of the invention is less than that in a final product in the making of which no gel is used, the proportion of edible comminuted material of substantial absorbent capacity required is correspondingly less.

Gelatine is insoluble but softens and swells in cold water. It is soluble in water at temperatures such as are used in drying the granules. Consequently, the gelatine of the gel which was mixed with the fat enters into a state of water solution in the initial period of the operation of drying the granules, providing a carrier medium for the flavoring and other substances in the granules and thereby assisting in the blending of the several ingredients. During the later portion of the drying period the gelatine becomes dehydrated and adheres in microscopic film to the pore walls of the granules, to a great extent sealing the fat present in the granules. The gelatine also acts as a binder to give coherence to the material in the granules and because of this fact the proportion of other binders such as dextrose and milk may be decreased. When the completed product is used to prepare soup or other food dishes, water is added to the granules and heat is applied. The gelatine re-dissolves in the hot water, giving body to the soup or other food product. If the thus prepared food dish is served cold, the thickening effect of the gelatine is more pronounced.

The parts of food animals rich in gelatine are usually also rich in the flavoring and aromatic substances characteristic of the animal. This is particularly true of the feet of chickens and other fowl used as food. Therefore, in accordance with this modified form of the invention a product is obtained which is inexpensive, of high nutritive value, which gives body to the prepared food dish, contains a small percentage of filler, and possesses flavor and aroma to a high degree. These advantages obtained by using the feet of the chicken are not attainable when chicken fat is the only portion of the carcass used in making the product, since chicken fat is expensive, contains virtually no gelatine, has unbalanced food value, and is deficient in those flavoring and aromatic substances characteristic of chicken.

If desired, chicken fat taken from the body portion of the carcass may be omitted from the mixture, reliance for the fat constituent of the product being made upon the fat present in the gel made from the chicken feet. Since, however, there is relatively little fat in this gel, it is preferable to mix the gel with fat obtained from the body portion of the carcass.

As used herein, the word "animal" is meant to include the four-footed animals and birds. The word "granules" is means to include granules of relatively equal dimensions in all directions, elongated spicules, and other forms which comminuted material may take.

The invention has been given specific application in the above description, but it is not intended that it be limited to this or any other one application, but is to be construed in accordance with the appended claims.

I claim as my invention:

1. A process of making a dry, granular food product, comprising: mixing rendered animal fat with an edible, comminuted material of substantial absorbent capacity; hydrating the mixture to a pasty condition; comminuting the mixture; and dehydrating the comminuted bodies at a temperature below the boiling point of water until they contain no free water and substantially no capillary water, the proportion of material of substantial absorbent capacity being sufficient to hold absorbed in the dehydrated bodies the fat and other non-aqueous constituents which are liquid or partially liquid at normal atmospheric temperature and being sufficient to provide a free flowing, comminuted product of shape-retaining bodies.

2. The process defined in claim 1 in which the material of substantial absorbent capacity comprises a comminuted, cereal product.

3. The process defined in claim 1 in which the hydrating agent comprises milk.

4. The process defined in claim 1 in which the material of substantial absorbent capacity comprises a finely comminuted, cereal product, in which the mixture prior to hydration is augmented by the addition of finely comminuted vegetables, spices, seasonings, and dextrose, and in which the hydrating agent comprises milk.

5. The process defined in claim 1 in which the mixture prior to dehydration is augmented by the addition of a dried, finely comminuted, meat product, the rendered animal fat and the dried, finely comminuted meat product being obtained from animals of the same kind.

6. A process of making a dry, granular food product, comprising: aqueous cooking parts of an animal having a substantial gelatine constituent, such as the hoofs of cattle and sheep and the feet of galliformes and other food birds; straining the solids from the cooked mass to leave a gel; mixing the gel with rendered fat obtained from the body of an animal of the same kind as that from which the gel is obtained, the gel being a substantial proportion of the mixture of fat and gel; mixing with the mixed fat and gel an edible, comminuted material of substantial absorbent capacity; hydrating the mixture to a pasty condition; comminuting the mixture; and dehydrating the comminuted bodies at a temperature below the boiling point of water until they contain no free water and substantially no capillary water, the proportion of material of substantial absorbent capacity being sufficient to hold absorbed in the dehydrated bodies the fat and other non-aqueous constituents which are liquid or partially liquid at normal atmospheric temperature, and being sufficient to provide a free flowing, comminuted product of shape-retaining bodies.

7. The process defined in claim 6 in which the gel is obtained by steam cooking at superatmospheric pressure the feet of galliformes in closed containers, and in which the gel is at least 50% of the mixture of gel and fat.

8. The process defined in claim 6 in which the gel is obtained by steam cooking at superatmospheric pressure the feet of galliformes in closed containers; in which the gel constitutes at least 50% of the mixture of fat and gel; in which the material of substantial adsorbent capacity comprises a finely comminuted, cereal product; in which the mixture prior to hydration is augmented by the addition of dried, finely comminuted vegetables; and in which the hydrating agent comprises milk.

9. A process of making a dry, granular food product, comprising: steam cooking at superatmospheric pressure the feet of galliformes in closed containers; straining the solids from the cooked mass to leave a gel; mixing the gel with an edible, comminuted material of substantial absorbent capacity; hydrating the mixture to a pasty condition; comminuting the mixture; and dehydrating the comminuted bodies at a temperature below the boiling point of water until they contain no free water and substantially no capillary water, the proportion of material of substantial absorbent capacity being sufficient to hold absorbed in the dehydrated bodies the non-aqueous constituents which are liquid or partially liquid at normal atmospheric temperature, and sufficient to provide a free flowing, comminuted product of shape-retaining bodies.

FRED H. BARKER.

CERTIFICATE OF CORRECTION.

Patent No. 2,373,805. April 17, 1945.

FRED H. BARKER.

It is hereby certified that error appears in the printed specification of the above numbered patent requiring correction as follows: Page 2, second column, line 42, for the word "means" read --meant--; page 3, first column, line 6, claim 5, for "dehydration" read --hydration--; and that the said Letters Patent should be read with this correction therein that the same may conform to the record of the case in the Patent Office.

Signed and sealed this 7th day of August, A. D. 1945

Leslie Frazer (Seal) Acting Commissioner of Patents.

which the mixture prior to hydration is augmented by the addition of finely comminuted vegetables, spices, seasonings, and dextrose, and in which the hydrating agent comprises milk.

5. The process defined in claim 1 in which the mixture prior to dehydration is augmented by the addition of a dried, finely comminuted, meat product, the rendered animal fat and the dried, finely comminuted meat product being obtained from animals of the same kind.

6. A process of making a dry, granular food product, comprising: aqueous cooking parts of an animal having a substantial gelatine constituent, such as the hoofs of cattle and sheep and the feet of galliformes and other food birds; straining the solids from the cooked mass to leave a gel; mixing the gel with rendered fat obtained from the body of an animal of the same kind as that from which the gel is obtained, the gel being a substantial proportion of the mixture of fat and gel; mixing with the mixed fat and gel an edible, comminuted material of substantial absorbent capacity; hydrating the mixture to a pasty condition; comminuting the mixture; and dehydrating the comminuted bodies at a temperature below the boiling point of water until they contain no free water and substantially no capillary water, the proportion of material of substantial absorbent capacity being sufficient to hold absorbed in the dehydrated bodies the fat and other non-aqueous constituents which are liquid or partially liquid at normal atmospheric temperature, and being sufficient to provide a free flowing, comminuted product of shape-retaining bodies.

7. The process defined in claim 6 in which the gel is obtained by steam cooking at superatmospheric pressure the feet of galliformes in closed containers, and in which the gel is at least 50% of the mixture of gel and fat.

8. The process defined in claim 6 in which the gel is obtained by steam cooking at superatmospheric pressure the feet of galliformes in closed containers; in which the gel constitutes at least 50% of the mixture of fat and gel; in which the material of substantial adsorbent capacity comprises a finely comminuted, cereal product; in which the mixture prior to hydration is augmented by the addition of dried, finely comminuted vegetables; and in which the hydrating agent comprises milk.

9. A process of making a dry, granular food product, comprising: steam cooking at superatmospheric pressure the feet of galliformes in closed containers; straining the solids from the cooked mass to leave a gel; mixing the gel with an edible, comminuted material of substantial absorbent capacity; hydrating the mixture to a pasty condition; comminuting the mixture; and dehydrating the comminuted bodies at a temperature below the boiling point of water until they contain no free water and substantially no capillary water, the proportion of material of substantial absorbent capacity being sufficient to hold absorbed in the dehydrated bodies the non-aqueous constituents which are liquid or partially liquid at normal atmospheric temperature, and sufficient to provide a free flowing, comminuted product of shape-retaining bodies.

FRED H. BARKER.

CERTIFICATE OF CORRECTION.

Patent No. 2,373,805.                                                April 17, 1945.

FRED H. BARKER.

It is hereby certified that error appears in the printed specification of the above numbered patent requiring correction as follows: Page 2, second column, line 42, for the word "means" read --meant--; page 3, first column, line 6, claim 5, for "dehydration" read --hydration--; and that the said Letters Patent should be read with this correction therein that the same may conform to the record of the case in the Patent Office.

Signed and sealed this 7th day of August, A. D. 1945

Leslie Frazer (Seal)                                              Acting Commissioner of Patents.